United States Patent
Karatas

(10) Patent No.: US 10,612,611 B2
(45) Date of Patent: Apr. 7, 2020

(54) CARRIER BODY FOR A BRAKE PAD OF A DISK BRAKE WITH ABSORBER MASS FOR CHANGING THE VIBRATION

(71) Applicant: Federal-Mogul Bremsbelag GmbH, Glinde (DE)

(72) Inventor: Ilhami Karatas, Glinde (DE)

(73) Assignee: FEDERAL-MOGUL BREMSBELAG GMBH, Glinde (DE)

( * ) Notice: Subject to any disclaimer, the term of this patent is extended or adjusted under 35 U.S.C. 154(b) by 0 days.

(21) Appl. No.: 15/030,915

(22) PCT Filed: Oct. 20, 2014

(86) PCT No.: PCT/EP2014/072448
§ 371 (c)(1),
(2) Date: Apr. 21, 2016

(87) PCT Pub. No.: WO2015/059097
PCT Pub. Date: Apr. 30, 2015

(65) Prior Publication Data
US 2016/0265610 A1    Sep. 15, 2016

(30) Foreign Application Priority Data
Oct. 21, 2013   (DE) .................. 10 2013 111 584

(51) Int. Cl.
| F16D 65/00 | (2006.01) |
| F16D 65/092 | (2006.01) |
| F16D 65/095 | (2006.01) |

(52) U.S. Cl.
CPC ..... *F16D 65/0006* (2013.01); *F16D 65/0018* (2013.01); *F16D 65/092* (2013.01); *F16D 65/095* (2013.01); *F16D 2250/0023* (2013.01)

(58) Field of Classification Search
CPC ............. F16D 65/0018; F16D 65/0006; F16D 65/092; F16D 65/095
(Continued)

(56) References Cited

U.S. PATENT DOCUMENTS 2,302,772 A * 11/1942 Huck .................. F16B 5/04
29/524.1
3,680,429 A * 8/1972 Briles .................. B21J 15/02
29/524.1
(Continued)

FOREIGN PATENT DOCUMENTS

| DE | 538337 C | 11/1931 |
| DE | 2914629 A1 | 10/1980 |

(Continued)

OTHER PUBLICATIONS

International Search Report from the corresponding PCT Application No. PCT/EP2014/072448, dated Jan. 26, 2015.
(Continued)

*Primary Examiner* — Bradley T King
*Assistant Examiner* — Mahbubur Rashid
(74) *Attorney, Agent, or Firm* — Porter Wright Morris & Arthur LLP

(57) ABSTRACT

In order for a carrier body, which has a friction pad carrier plate (10) and at least one first absorber mass (14) rigidly connected to the friction pad carrier plate, to be further improved in such a way that the rigid connection between friction pad carrier plate and the first absorber mass is made more robust, provision is made for a first pin-like projection (18) of the first absorber mass (14) to be inserted into the first hole of the friction pad carrier plate (10) such that the head (28) of the first pin-like projection (18) protrudes out of the first hole and bears partially against a first chamfer (26) in the region of a first edge (22) of the first hole.

16 Claims, 4 Drawing Sheets

(58) Field of Classification Search
USPC .................................................. 188/250 E
See application file for complete search history.

(56) References Cited

U.S. PATENT DOCUMENTS

| | | | | | |
|---|---|---|---|---|---|
| 3,754,731 | A | * | 8/1973 | Mackal | F16L 41/082 137/223 |
| 3,828,422 | A | * | 8/1974 | Schmitt | F16B 4/004 29/524.1 |
| 3,840,980 | A | * | 10/1974 | Auriol | B21J 15/02 29/524.1 |
| 4,000,680 | A | * | 1/1977 | Briles | F16B 19/06 29/509 |
| 4,048,708 | A | | 9/1977 | Briles | |
| 4,429,770 | A | | 2/1984 | Weisbrod | |
| 4,493,141 | A | * | 1/1985 | Krezak | F16B 19/06 29/509 |
| 4,615,098 | A | * | 10/1986 | Come | B21D 39/044 285/330 |
| 4,985,979 | A | * | 1/1991 | Speakman | B21J 15/02 29/512 |
| 5,035,041 | A | * | 7/1991 | Matuschek | B21J 15/02 29/509 |
| 5,042,137 | A | | 8/1991 | Speller, Sr. | |
| 5,231,747 | A | | 8/1993 | Clark et al. | |
| 5,332,349 | A | * | 7/1994 | Gerwin | F16B 19/06 29/525.06 |
| 5,499,440 | A | * | 3/1996 | Satoh | B21K 25/00 29/512 |
| 5,557,835 | A | | 9/1996 | Brandts | |
| 5,855,054 | A | | 1/1999 | Rivera et al. | |
| 5,868,356 | A | * | 2/1999 | Giedris | B21J 15/02 244/132 |
| 5,887,686 | A | * | 3/1999 | Tanaka | F16D 65/00 188/250 E |
| 6,089,062 | A | | 7/2000 | Zemp | |
| 6,913,120 | B2 | * | 7/2005 | Bosco | F16D 65/092 188/250 E |
| 6,994,190 | B1 | * | 2/2006 | Gotti | F16D 55/2262 188/250 E |
| 7,032,723 | B2 | * | 4/2006 | Quaglia | F16D 65/0018 188/250 E |
| 7,475,759 | B1 | * | 1/2009 | Sherman, II | F16D 55/227 188/73.39 |
| 8,794,397 | B2 | * | 8/2014 | Crippa | F16D 65/0018 188/250 B |
| 9,890,823 | B2 | | 2/2018 | Kümmel et al. | |
| 2004/0074712 | A1 | * | 4/2004 | Quaglia | F16D 65/0018 188/73.35 |
| 2004/0134720 | A1 | | 7/2004 | Niebling et al. | |
| 2004/0134725 | A1 | | 7/2004 | Bosco et al. | |
| 2005/0067235 | A1 | | 3/2005 | Pham et al. | |
| 2006/0096814 | A1 | | 5/2006 | Hoffrichter et al. | |
| 2006/0266599 | A1 | * | 11/2006 | Denys | F16D 65/0012 188/73.37 |
| 2007/0045063 | A1 | | 3/2007 | Naito et al. | |
| 2012/0021055 | A1 | | 1/2012 | Schoenfisch et al. | |
| 2012/0024643 | A1 | | 2/2012 | Crippa et al. | |
| 2012/0152664 | A1 | * | 6/2012 | Crippa | F16D 65/0018 188/72.4 |
| 2012/0210550 | A1 | | 8/2012 | Swinford | |
| 2015/0107086 | A1 | | 4/2015 | Karatas et al. | |
| 2016/0281805 | A1 | | 9/2016 | Kümmel et al. | |
| 2016/0298684 | A1 | | 10/2016 | Itagaki et al. | |

FOREIGN PATENT DOCUMENTS

| | | |
|---|---|---|
| DE | 3315758 A1 | 10/1984 |
| DE | 69223612 T2 | 7/1998 |
| DE | 19812133 A1 | 9/1999 |
| DE | 19846463 A1 | 5/2000 |
| DE | 10305308 A1 | 4/2004 |
| DE | 10331052 A1 | 1/2005 |
| DE | 102014205232 A1 | 5/2015 |
| EP | 0727591 A1 | 8/1996 |
| EP | 1710460 A1 | 10/2006 |
| EP | 1307665 B1 | 10/2008 |
| JP | 58-170933 A | 10/1983 |
| JP | 2002-323020 A | 11/2002 |
| JP | 2010-531422 A | 9/2010 |
| JP | 2013-204760 A | 10/2013 |
| WO | 2009/001381 A1 | 12/2008 |
| WO | WO 2009001381 A1 * | 12/2008 ......... F16D 65/0018 |
| WO | 2015/059097 A1 | 4/2015 |
| WO | 2015/059098 A2 | 4/2015 |

OTHER PUBLICATIONS

Search Report from the priority German Application No. 10 2013 111 584.5, dated Jun. 13, 2014.
Search Report from the priority German Application No. 10 2013 111 584.5, dated Oct. 31, 2014.
Third Party Observations According to Article 115 EPC dated Aug. 4, 2019 from corresponding European Application No. 14790553.3, pp. 1-5.
Third Party Observation for Application No. EP20140790553 dated Aug. 4, 2019, 18:56 from corresponding European Application No. 14790553.3.
Third Party Observations According to Article 115 EPC, European Application No. 14786666.9, pp. 1-9 (Aug. 4, 2019).
Third Party Observation for Application No. EP20140786666 (Aug. 4, 2019 18:46).
Third Party Observation for Application No. EP20140786666 (Aug. 4, 2019 18:51).

* cited by examiner

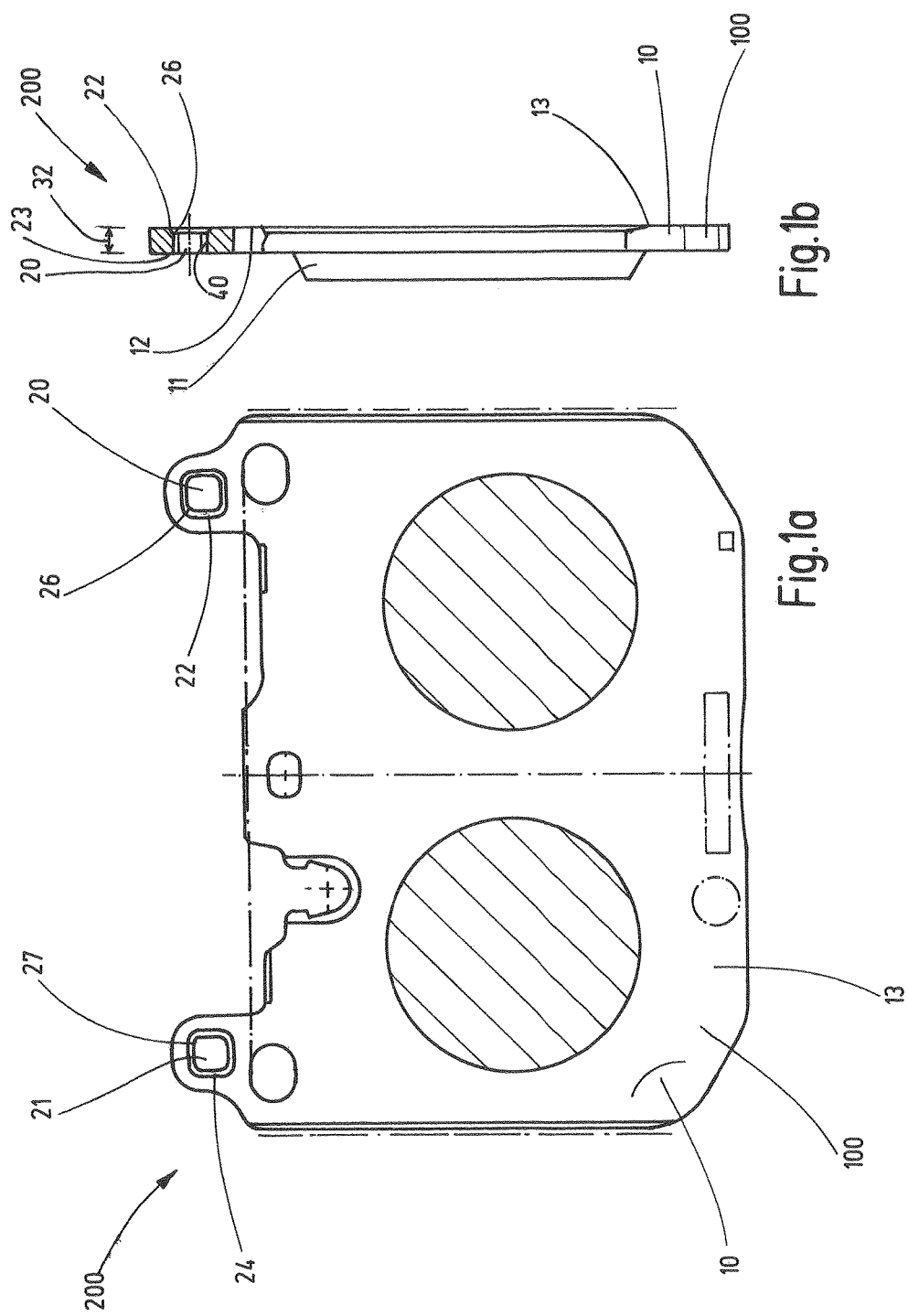

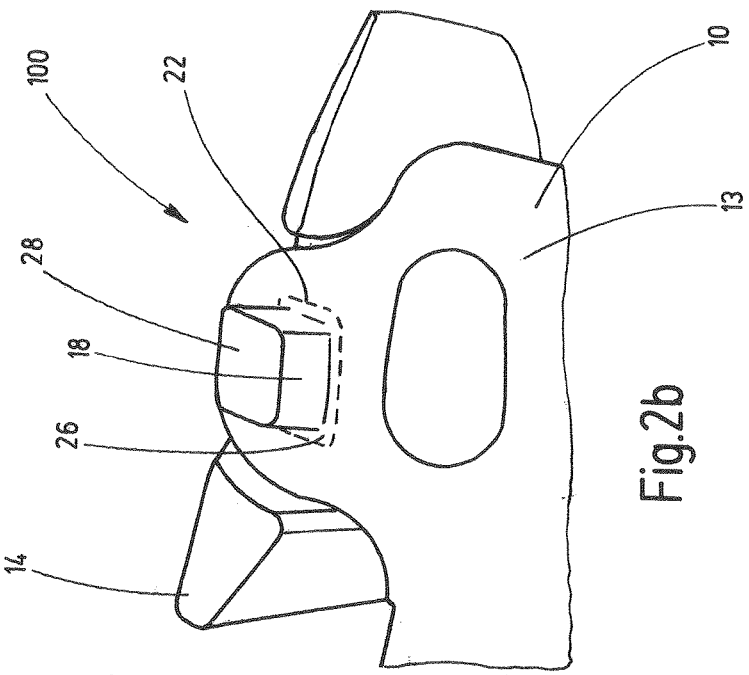
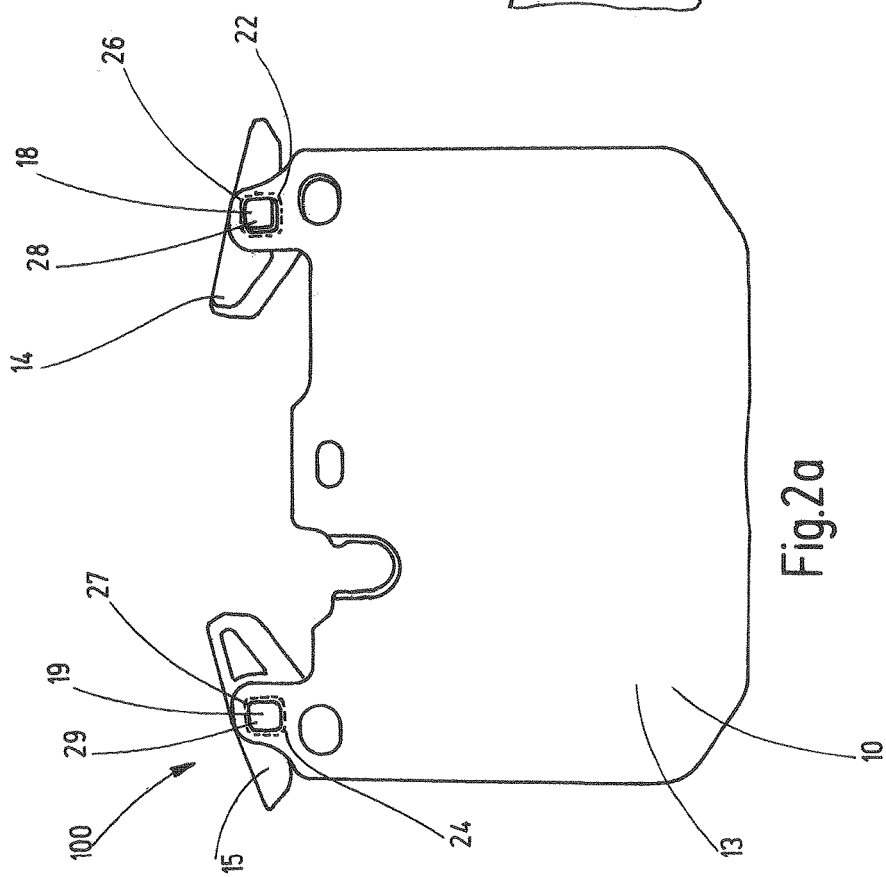

CARRIER BODY FOR A BRAKE PAD OF A DISK BRAKE WITH ABSORBER MASS FOR CHANGING THE VIBRATION

The invention relates to a carrier body for a brake pad of a disk brake, wherein at least one first damper mass is rigidly arranged on a friction pad carrier plate of the carrier body for the purposes of changing the vibration.

PRIOR ART

It is known from the prior art for mass elements to be attached to a friction pad carrier plate for brake pads for the purposes of changing the vibration and thus reducing noise.

EP 1 307 665 B1 has disclosed a brake block for a disk brake, which brake block has a plate for carrying a friction pad, wherein the brake block has a device which is rigidly assigned to the plate in order to form a single rigid body and in order to vary the mass of at least one part of the plate in order to realize an inertia of the brake block which substantially prevents vibrations of the brake block that could cause noise of the brake disk during braking operations.

DE 10 331 052 A2 describes a brake pad backplate for a brake pad of a vehicle disk brake. Here, a damper mass is provided on the brake pad backplate for the purposes of changing the vibration, wherein, on a carrying section for the brake pad, there is integrally formed at least one elongate arm, which arm has an end connected to the carrying section and has a free end, runs adjacent to the carrying section without making contact as far as a free end, and lies in the main plane of extent of the brake pad backplate.

WO 2009/001 381 A1 has disclosed a brake block for disk brakes, which brake block has a plate which serves as a support for a friction material layer, wherein at least one load is applied to the plate and fastened thereto by way of clamping. The load changes the mass of at least one part of the plate in order to realize an inertia of the brake block which substantially prevents the vibrations of the brake block during braking operations. The load has at least one abutting surface which is suitable for abutting against the edge of the plate and thereby defining a restriction of the rotation of the load about an axis of rotation of the disk.

Presentation of the Invention: Problem, Solution, Advantages

The problem addressed by the present invention is that of improving a carrier body for a brake pad of a disk brake, having a friction pad carrier plate and at least one first damper mass for the purposes of changing the vibration, in such a way that the rigid connection between friction pad carrier plate and damper mass is more robust in relation to the solutions proposed in the prior art, and withstands greater loads.

Said object is achieved by way of the provision of a carrier body for a brake pad of a disk brake, wherein the carrier body has a friction pad carrier plate for holding a friction pad and has at least one first damper mass, connected rigidly to the friction pad carrier plate, for the purposes of changing the vibration. The first damper mass has a first pin-like projection which protrudes from a first side surface of the first damper mass. On the end of the first pin-like projection, the pin-like projection has a head. The friction pad carrier plate of the carrier body has a first hole for receiving the first pin-like projection.

Here, the first pin-like projection is inserted into the first hole such that the head, and thus the end, of the first pin-like projection protrudes out of the first hole. Furthermore, according to the invention, a first bevel, or chamfering, is provided in the region of a first edge of the first hole in the friction pad carrier plate. The head, or the end, of the first pin-like projection bears at least partially against said first bevel. Therefore, the head, or the end, of the first pin-like projection is at least partially in direct contact with the bevel, or with the chamfering, in the region of the first edge of the first hole of the friction pad carrier plate.

The carrier body according to the invention therefore has at least one friction pad carrier plate and a first damper mass connected rigidly to said friction pad carrier plate. Here, the friction pad carrier plate may be composed of any suitable material, and is of substantially plate-like form. For the production of a brake pad, a friction pad, or friction pad material, is applied to a first side surface of the friction pad carrier plate.

Through the provision of a damper mass which is rigidly connected to the friction pad carrier plate, the vibration can be changed, and thus noises during braking operations can be reduced. In this way, the natural frequency of the device is thus changed. In the context of this invention, a damper mass is to be understood to mean a mass element composed of any suitable material which is fastened not to multiple objects, or rigidly connected to multiple objects, but is merely rigidly connected to the friction pad carrier plate of the carrier body.

In the context of this invention, a rigid connection is to be understood to mean a connection between friction pad carrier plate and the damper mass, wherein the damper mass is not rotatable or pivotable about an axis but is arranged fixedly on the friction pad carrier plate in a specified and predefined position. Thus, the rigid connection between the friction pad carrier plate and the first damper mass can be severed only by the action of extreme or very high force.

A pin-like projection which protrudes from the first side surface of the first damper mass is to be understood as a projection of elongate form. It may be for example a cylindrical, conical or polygonal elongate projection. An elongate projection is to be understood to mean a projection which has a length greater than a maximum width.

The head of the pin-like projection is to be understood to mean the end of the pin-like projection. Thus, the head of the pin-like projection is arranged in the region of a face side of the first pin-like projection, wherein said face side is averted from the first side surface of the first damper mass. Thus, the pin-like projection extends from the first side surface of the first damper mass to the end or the head of said projection. The head of the pin-like projection is formed integrally with the pin-like projection. The pin-like projection is preferably formed in one piece with the damper mass. The head of the pin-like projection is formed by the face-side region of the pin-like projection. Before the exertion of a force on the pin-like projection, or before the production of the rigid connection between the friction pad carrier plate and the first damper mass, the face side of the pin-like projection constitutes said head. During the exertion of a force on the pin-like projection, said head is deformed, and has the shape of a flat head and/or the shape of a mushroom head. Here, after the exertion of the force, said head has a greater diameter or a greater maximum width than the rest of the pin-like projection. Said head is thus deformed by the exertion of the force so as to be expanded in terms of circumference.

Since the first pin-like projection is inserted into the first hole of the friction pad carrier plate such that the head of the first pin-like projection protrudes out of the first hole, the first pin-like projection is formed so as to be longer than the depth of the first hole. Provision is preferably made whereby, before the exertion of a force on the first pin-like projection and after the insertion of the first pin-like projection into the first hole, the first pin-like projection protrudes out of the first hole not only by way of its face side but also by more than that. After the exertion of the force on the first pin-like projection, the latter still protrudes out of the first hole by way of its head.

The first edge of the first hole is an encircling edge, which delimits the first hole, in the region of the transition between a second side surface of the friction pad carrier plate and the hole inner side, or the internal wall, of the first hole.

In the context of the present invention, a bevel is to be understood to mean a chamfering or rounding of the first edge. According to the invention, after insertion of the first pin-like projection into the first hole of the friction pad carrier plate and fastening of the first damper mass to the friction pad carrier plate, the head of the first pin-like projection bears at least partially against the first bevel. Thus, the head of the first pin-like projection bears at least regionally against the first bevel. For example, the mushroom-shaped or flat head of the first pin-like projection bears by way of its underside and/or edge region against the first bevel after the exertion of the force on the first pin-like projection.

Owing to the provision of a first bevel in the region of the first edge of the first hole in the friction pad carrier plate, and the insertion, and/or the subsequent fastening, of the first pin-like projection in the first hole, it is possible to realize an improved form fit between the damper mass and the friction pad carrier plate. In this way, the connection between the first damper mass and the friction pad carrier plate is made more robust. The material of the pin-like projection in the region of the head thereof is not damaged, or is not so quickly and easily damaged, during the fastening process. For example, it is thus possible for cracking in the region of the head of the first pin-like projection to be prevented or at least reduced.

A rigid connection between the friction pad carrier plate and the first damper mass may be realized, after insertion of the first pin-like projection into the first hole, by exertion of a force directed vertically onto the first pin-like projection. For example, upsetting can be realized by exertion of a tumbling or pressing action on the first pin-like projection at least in the region of the head thereof. Tumbling is to be understood to mean substantially vertical pressing or pushing by way of a pressing head or pushing means and simultaneous rotation and/or pivoting of the pressing head or pushing means.

In particular, through the provision of a first bevel in the region of the first edge of the first hole of the friction pad carrier plate, it is also possible, during the exertion of a vertically directed force onto the end of the first pin-like projection, to realize improved and more intense upsetting in the region of the center and of the start of the first pin-like projection. Also, in this way, the form fit between friction pad carrier plate and the first damper mass, or of the first pin-like projection within the first hole, that is to say the form fit between the first pin-like projection and the internal wall of the first hole, can be intensified.

The first bevel may be in the form of a chamfering or rounding of the first edge of the first hole of the friction pad carrier plate. It is preferably the case that a chamfering, very particularly preferably a fully circumferential chamfering, of the first edge of the first hole of the friction pad carrier plate is formed by way of the first bevel. Through the provision of the first bevel, the first hole has a larger opening in said region than in the interior of the first hole.

Furthermore, provision is preferably made whereby the first bevel is at a first angle with respect to the internal wall of the first hole, wherein the first angle is between 10° and 80°. The first angle between the first bevel and the internal wall of the first hole particularly preferably lies between 25° and 60°, and very particularly preferably between 40° and 50°. For example, the first angle could be 45°. Here, the first angle is preferably formed so as to be substantially constant over the full circumference around the first hole, or over the full circumference along the first edge of the first hole.

The first bevel preferably projects into the first hole over a first depth, wherein the first depth corresponds to less than 50% of the total depth of the first hole. The first depth over which the first bevel projects into the first hole particularly preferably corresponds to less than 40%, very particularly preferably less than 30%, of the total depth of the first hole. It would for example be possible for the first bevel to project into the first hole over a first depth of less than 20% of the total depth of the first hole.

The depth of the first hole corresponds substantially to the thickness of the friction pad carrier plate in the region of the first hole. Thus, the first hole is provided so as to extend all the way through the friction pad carrier plate. The depth of the first hole is to be understood to mean the total depth or length of the first hole through the friction pad carrier plate. The first depth over which the first bevel projects into the hole is to be understood to mean the spacing between a plane which lies on the second side surface of the friction pad carrier plate and the end of the first bevel within the first hole along a central axis of the first pin-like projection. Thus, the first depth is to be understood to mean the spacing, projecting vertically into the first hole, to the end of the first bevel.

The first pin-like projection may be of any suitable form. The first pin-like projection is preferably of conical form. Here, the cross section of the first pin-like projection decreases, as viewed from the first side surface of the first damper mass, toward the head of the first pin-like projection. It is particularly preferably the case that the cross section decreases constantly and linearly, as viewed from the first side surface of the first damper mass, toward the head of the first pin-like projection. Provision is thus preferably made whereby the first pin-like projection is at least regionally of conical form, or at least regionally has the shape of a truncated cone. Here, the cross section of the first pin-like projection may be of circular, oval or polygonal form.

It is preferably the case that at least one indentation is formed in the first bevel. Here, provision is particularly preferably made whereby the at least one indentation is arranged around the first hole over the full circumference. Furthermore, provision is preferably made whereby the indentation is arranged in encircling fashion in the first bevel around the first hole. Furthermore, it is possible for multiple mutually spaced-apart indentations to be arranged in ring-shaped fashion in the first bevel around the first hole.

The first side surface of the first damper mass preferably bears against a first side surface of the friction pad carrier plate. Therefore, the first damper mass is, in the region of its first side surface, at least regionally in direct contact with the friction pad carrier plate. Here, it is preferably provided that the friction pad, or the friction pad material, can be arranged on the first side surface of the friction pad carrier plate. A damping plate can preferably be arranged on the second side surface, which is averted from the first side surface of the friction pad carrier plate.

Furthermore, provision is preferably made for the internal wall of the first hole to lie at a second angle with respect to the first side surface of the first damper mass, wherein the second angle lies between 75° and 105°, particularly preferably between 80° and 100°, and very particularly preferably between 85° and 95°. For example, the second angle in the region of a second edge of the first hole may be of substantially right-angled form. Thus, the entry region of the first hole in the region in which the first side surface of the first damper mass bears against the first side surface of the friction pad carrier plate is preferably of substantially right-angled form, wherein the exit region of the first hole, that is to say in the region of the first edge of the first hole, is chamfered by way of the first bevel.

It is preferably the case that, within the first hole, the first pin-like projection is in contact with, or bears against, the internal wall of the first hole over substantially the full circumference. It is thus preferably the case that a substantially fully circumferential form fit is formed between the first pin-like projection and the internal wall of the first hole. It is particularly preferably the case that, within the first hole, the form fit between the first pin-like projection and the internal wall of the first hole is formed substantially over the entire length and/or the entire depth of the first hole.

The first pin-like projection preferably protrudes by way of its head out of the first hole over a first length, wherein the first length corresponds to less than 25%, particularly preferably less than 15%, very particularly visibly less than 10%, of the total depth, or length, of the first hole. Normally, a friction pad carrier plate for a brake pad of a disk brake for motor vehicles has a thickness of between 5 mm and 15 mm. For example, it would be possible for the first hole to have a total depth of 10 mm, wherein the first pin-like projection protrudes by way of its head out of the first hole only over a first length of 1 mm to 2 mm. The first length, over which the first pin-like projection protrudes by way of its head out of the first hole, is determined after the exertion of the force on the first pin-like projection, or after the production of the rigid connection between friction pad carrier plate and the first damper mass.

The first pin-like projection may have any suitable cross section. For example, the first pin-like projection may have a polygonal, for example triangular, tetragonal, pentagonal or hexagonal cross section. Furthermore, it would be possible for the first pin-like projection to have a circular or oval cross section. Here, provision is preferably made whereby the shape of the first hole, or the cross section of the first hole, has a cross section corresponding to the cross section of the first pin-like projection. The maximum width of the pin-like projection is in this case preferably slightly smaller than the minimum opening width of the first hole. Thus, it is possible for the first pin-like projection to be inserted into the first hole without deformation, or without relatively great action of force.

Once the first pin-like projection has been inserted into the first hole, upsetting or deformation of the first pin-like projection in the head region, and preferably within the first hole, is realized by way of the exertion of a force directed vertically onto the head region of the first pin-like projection. This causes the first pin-like projection to be upset, and a form fit to be realized between the first pin-like projection and the internal wall of the first hole.

Furthermore, provision is preferably made whereby the carrier body has a second damper mass, connected rigidly to the friction pad carrier plate, for the purposes of changing the vibration. The second damper mass is preferably designed in the same way as the first damper mass. Here, the friction pad carrier plate has a second hole through which the second pin-like projection, specifically the pin-like projection of the second damper mass, can be inserted. All of the abovementioned features relating to the first damper mass or the first hole in the friction pad carrier plate are also provided for the second damper mass or the second hole of the friction pad carrier plate. For example, the friction pad carrier plate has a second bevel in the region of the first edge of the second hole, which second bevel is, after the insertion of the second pin-like projection, at least regionally connected to the head of the second pin-like projection.

According to the invention, a brake pad for a disk brake is also provided. Here, the brake pad has a carrier body as described above, and a friction pad arranged on the friction pad carrier plate.

Also provided according to the invention is a disk brake, in particular a partially lined disk brake, which has a brake pad as described above with a carrier body as claimed in claims 1 to 13 and has a friction pad arranged on the friction pad carrier plate of the carrier body.

Also provided according to the invention is a method for producing a carrier body, wherein the carrier body has a friction pad carrier plate for holding a friction pad and has at least one first damper mass which is connected rigidly to the friction pad carrier plate. According to the invention, for the production of the carrier body, the following steps are provided:

a) inserting the first pin-like projection of the first damper mass into the first hole, in such a way that the end of the first pin-like projection, or the head of the first pin-like projection, protrudes out of the first hole, b) pushing the first damper mass against the friction pad carrier plate in order that the first side surface of the first damper mass at least regionally bears against, or is in contact with, a first side surface of the friction pad carrier plate, c) exerting a force, which is directed substantially vertically onto the first pin-like projection, by way of a tumbling or pressing action until the first pin-like projection bears by way of its head partially against the first bevel in the region of the first edge of the first hole, wherein said force is exerted during the pushing of the first damper mass against the friction pad carrier plate.

BRIEF DESCRIPTION OF THE DRAWINGS

FIG. 1a is a schematic illustration of a brake pad having a friction pad carrier plate and holes arranged therein for receiving damper masses, FIG. 1b shows a cross section through a brake pad having a friction pad carrier plate and having a friction pad arranged on the friction pad carrier plate, FIG. 2a shows a perspective view of a carrier body having a friction pad carrier plate and two damper masses arranged thereon, FIG. 2b shows a perspective view of a detail of a friction pad carrier plate and of the damper mass connected thereto.

PREFERRED EMBODIMENTS OF THE INVENTION

Figure 3A:
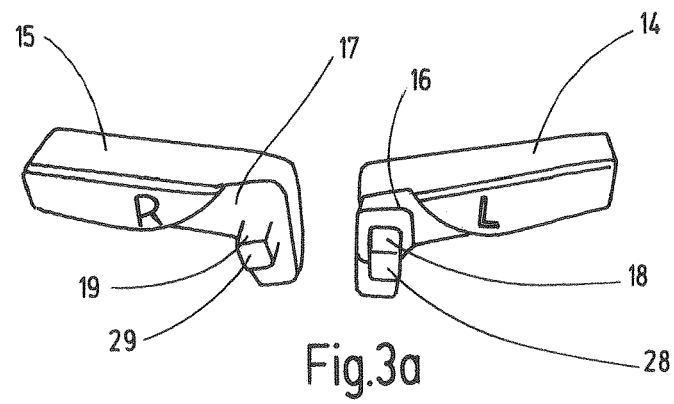
FIGS. 3a-3d show different shapes of damper masses.
Figure 3B:
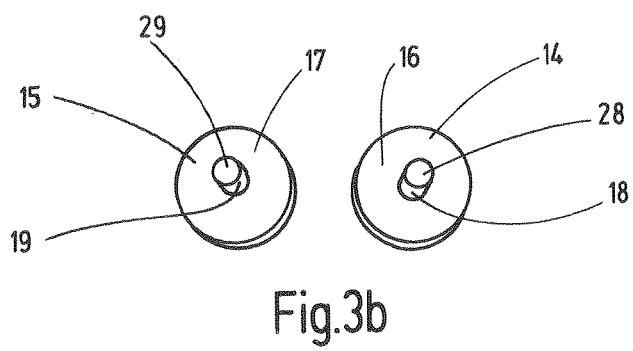
Figure 3C:
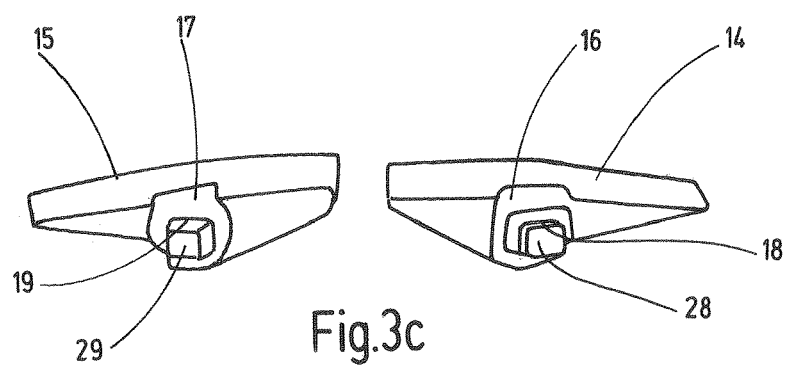
Figure 3D:
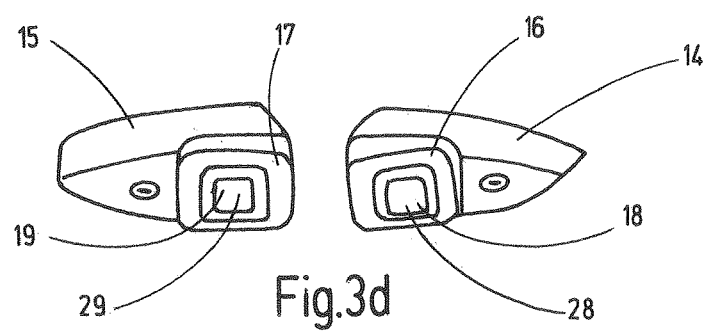

FIGS. 1a and 1b show a brake pad 200 in a front view and in cross section. The brake pad 200 has a carrier body 100, wherein only the friction pad carrier plate 10 of the carrier body 100 is shown, without damper masses 14, 15 attached thereto. Furthermore, the brake pad 200 has a friction pad 11 arranged on the first side surface 12 of the friction pad carrier plate 10.

At its two upper corner regions, the friction pad carrier plate 10 has in each case one hole, specifically a first hole 20 and a second hole 21, for receiving the pin-like projections 18, 19 of the two damper masses 14, 15. The exit opening of the first hole is in this case delimited by a first encircling edge 22 on the second side surface 13 of the friction pad carrier plate 10. In the region of said first edge 22 of the first hole 20, there is arranged a first bevel 26. As a result, the first edge 22 of the first hole 20 is formed with an encircling chamfer. The friction pad carrier plate 10 has a thickness 32 which, in the region of the first hole 20 and the second hole 21, corresponds to the respective depth 33, 34 of the corresponding hole 20, 21. The first bevel 26 and the second bevel 27 project into the first hole 20 and into the second hole 21 respectively over a first depth 37 and over a second depth 38 respectively. The first bevel 26 lies at a first angle 35 with respect to the internal wall 40 of the first hole 20. The second bevel 27 lies at a second angle 36 with respect to the internal wall 41 of the second hole 21.

FIGS. 2a and 2b show a perspective view of a carrier body 100 with a friction pad carrier plate 10 and two damper masses 14, 15 fastened rigidly thereto. Here, the first damper mass 14 is arranged with its first pin-like projection 18 in the first hole 20 of the friction pad carrier plate 10. As can be seen from FIGS. 2a and 2b, the end or the head 28 of the first pin-like projection 18 protrudes out of the first hole 20.

In order to connect the two damper masses 14, 15 fixedly and rigidly to the carrier plate 10, a force is exerted vertically on the first pin-like projection 18 and on the second pin-like projection 19 respectively by way of a tumbling or pressing action. Here, both the first pin-like projection 18 and the second pin-like projection 19 are upset and, in particular in the region of the head 28 of the first pin-like projection 18 and in the region of the head 29 of the second pin-like projection 19 respectively, are deformed such that the respective head 28, 29 of the two pin-like projections 18, 19 bear at least partially against the respective bevel 26, 27 in the region of the first edge 22 of the first hole 20 and in the region of the first edge 24 of the second hole 21 respectively. The respective pin-like projections 18, 19 protrude out of the respective hole 20, 21 over a first length 42 and over a second length 43 respectively after the exertion of the force, or after the production of the rigid connection of the two damper masses 14, 15 to the friction pad carrier plate 10. In this regard, reference is also made to FIG. 4. FIGS. 2a and 2b show the stage before the exertion of the force, or before the production of the rigid connection. In FIGS. 2a and 2b, the two damper masses 14, 15 have been inserted by way of their pin-like projections 18, 19 into the holes 20, 21.

FIGS. 3a to 3d show various shapes of damper masses 14, 15. Regardless of the shape of the respective damper mass 14, 15, each damper mass 14, 15 has a first and second pin-like projection 18, 19 respectively, which projections protrude from the first side surface 16 of the first damper mass 14 and from the second side surface 17 of the second damper mass 15 respectively. Here, the pin-like projections 18, 19 may be of substantially circular (cf. FIG. 3b) or polygonal (cf. FIGS. 3a, 3c and 3d) form.

Figure 4:
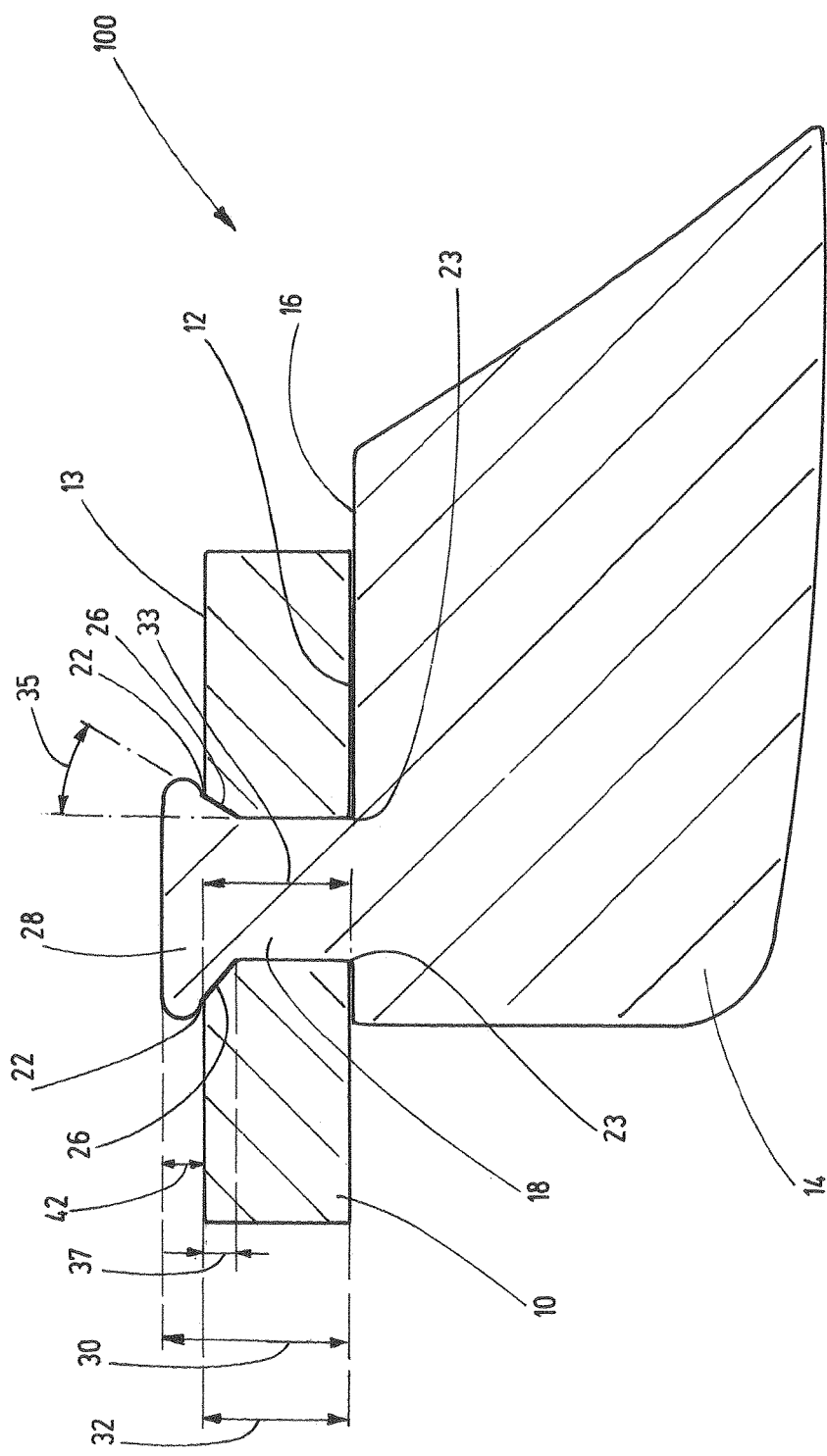
FIG. 4 is a sectional illustration of a detail of the connection of a damper mass to the friction pad carrier plate.

The respective first side surface 16, 17 of the two damper masses 14, 15 is connected to, or bears against, the first side surface 12 of the friction pad carrier plate 10 after the connection of the two damper masses 14, 15 to the friction pad carrier plate 10. FIG. 4 shows, as a sectional illustration, the fastening region between the friction pad carrier plate 10 and a first damper mass 14. Here, the first pin-like projection 18 of the first damper mass 14 has been inserted into the first hole 20 of the friction pad carrier plate 10. The first damper mass 14 bears by way of the first side surface 16 of the first damper mass 14 against the first side surface 12 of the friction pad carrier plate 10. By exertion of a tumbling or pressing action on the first pin-like projection 18, a rigid connection has been realized between the friction pad carrier plate 10 and the first damper mass 14. The first pin-like projection 18 has, owing to the provision of the first bevel 26 in the region of the first edge 22 of the first hole 20, been upset over the entire depth 33 of the first hole 20, such that, within the first hole 20, it is possible to see a form fit, formed over the full circumference and over the entire depth 33 of the first hole 20, between the first pin-like projection 18 and the internal wall 40 of the first hole 20. The first pin-like projection 18 protrudes by way of its head 28 out of the first hole 20 over a first length 42.

Furthermore, the head 28 of the first pin-like projection 18 bears regionally directly against the first bevel 26 in the region of the first edge 22 of the first hole 20.

In the region of the first hole 20, the friction pad carrier plate 10 has a thickness 32 which corresponds to the depth 33 of the first hole 20. The first bevel 26 projects into the first hole 20 over a first depth 37. Furthermore, the first bevel forms a first angle 35 with respect to the internal wall 40 of the first hole 20.

LIST OF REFERENCE NUMERALS

100 Carrier body
200 Brake pad
300 Disk brake
10 Friction pad carrier plate
11 Friction pad
12 First side surface of the friction pad carrier plate
13 Second side surface of the friction pad carrier plate
14 First damper mass
15 Second damper mass
16 First side surface of the first damper mass
17 First side surface of the second damper mass
18 First pin-like projection
19 Second pin-like projection
20 First hole
21 Second hole
22 First edge of the first hole
23 Second edge of the second hole
24 First edge of the second hole
25 Second edge of the second hole
26 First bevel
27 Second bevel
28 Head of the first pin-like projection
29 Head of the second pin-like projection
30 Length of the first pin-like projection
31 Length of the second pin-like projection
32 Thickness of the friction pad carrier plate
33 Depth of the first hole
34 Depth of the second hole
35 First angle
36 Second angle
37 First depth
38 Second depth
39 Indentation
40 Internal wall of the first hole
41 Internal wall of the second hole
42 First length
43 Second length

The invention claimed is:

1. A brake pad, comprising a carrier body and a friction pad, wherein the carrier body has a friction pad carrier plate on which the friction pad is arranged, wherein the carrier body has at least one first damper mass, connected rigidly to the friction pad carrier plate, for the purpose of changing vibration, wherein the first damper mass has a first side surface, wherein a first pin projection protrudes from the first side surface of the first damper mass and is formed in one piece with the damper mass, wherein the first pin projection has a head which is formed integrally with the pin projection and is arranged in the region of that face side of the first pin projection which is averted from the first side surface of the first damper mass, wherein the friction pad carrier plate has a first hole, and a first bevel is provided in a first edge of the first hole, wherein the first bevel is at a first angle between 10 degrees and 80 degrees with respect to an internal wall of the first hole and protrudes into the first hole to less than 50% of a depth of the first hole, and wherein the first pin projection is arranged in the first hole such that the head of the first pin projection protrudes out of the first hole over a first length corresponding to less than 25% of the depth of the first hole and bears against the first bevel in the first edge of the first hole, and wherein the first angle lies between 25 degrees and 60 degrees, the internal wall of the first hole is at a second angle with respect to the first side surface of the first damper mass, and the second angle lies between 85 degrees and 95 degrees.

2. The brake pad of claim 1, wherein the first pin projection has a polygonal, circular or oval cross section.

3. The brake pad of claim 1, wherein a chamfering of the first edge of the first hole is formed by the first bevel.

4. The brake pad of claim 1, wherein the first depth corresponds to less than 40% of a depth of the first hole.

5. The brake pad of claim 1, wherein the first pin projection is of conical form, with the cross section thereof decreasing from the first side surface of the first damper mass toward the head of the first pin projection.

6. The brake pad of claim 1, wherein the first side surface of the first damper mass bears against a first side surface of the friction pad carrier plate.

7. The brake pad of claim 1, wherein the internal wall of the first hole is at a second angle with respect to the first side surface of the first damper mass, wherein the second angle lies between 75 degrees and 105 degrees.

8. The brake pad of claim 1, wherein the first pin projection forms, within the first hole, a form fit with an internal wall of the first hole substantially over the full circumference.

9. The brake pad of claim 1, wherein the first pin projection forms, within the first hole, a form fit with the first bevel and an internal wall of the first hole substantially over an entire depth of the first hole.

10. The brake pad of claim 1, wherein the first length corresponds to less than 15% of a depth of the first hole.

11. The brake pad of claim 1, wherein the carrier body has a second damper mass which is rigidly connected to the friction pad carrier plate for the purpose of changing the vibration.

12. A disk brake, comprising the brake pad of claim 1.

13. A method for producing the brake pad of claim 1, comprising the following steps:
   a) inserting the first pin projection into the first hole,
   b) pushing the first damper mass against the friction pad carrier plate in order that the first side surface of the first damper mass bears against a first side surface of the friction pad carrier plate,
   c) exerting a force, which is directed substantially vertically onto the first pin projection, by way of a tumbling or pressing action until the first pin projection bears by way of its head partially against the first bevel in the region of the first edge of the first hole, wherein said force is exerted during the pushing of the first damper mass against the friction pad carrier plate, and
   d) arranging the friction pad on the friction pad carrier plate.

14. The brake pad of claim 1, wherein a fully circumferential chamfering of the first edge of the first hole is formed by the first bevel.

15. The brake pad of claim 1, wherein the first angle lies between 40 degrees and 50 degrees.

16. The brake pad of claim 1, wherein the first depth corresponds to less than 30% of a depth of the first hole.

* * * * *

UNITED STATES PATENT AND TRADEMARK OFFICE
CERTIFICATE OF CORRECTION

PATENT NO. : 10,612,611 B2
APPLICATION NO. : 15/030915
DATED : April 7, 2020
INVENTOR(S) : Karatas It is certified that error appears in the above-identified patent and that said Letters Patent is hereby corrected as shown below:

On the Title Page

Item (30), change "10 2013 111 584" to --10 2013 111 584.5--.

Signed and Sealed this
Eighteenth Day of August, 2020

Andrei Iancu
*Director of the United States Patent and Trademark Office*